KEY TELEPHONE SYSTEM SIGNALING CIRCUIT
Filed Jan. 20, 1966
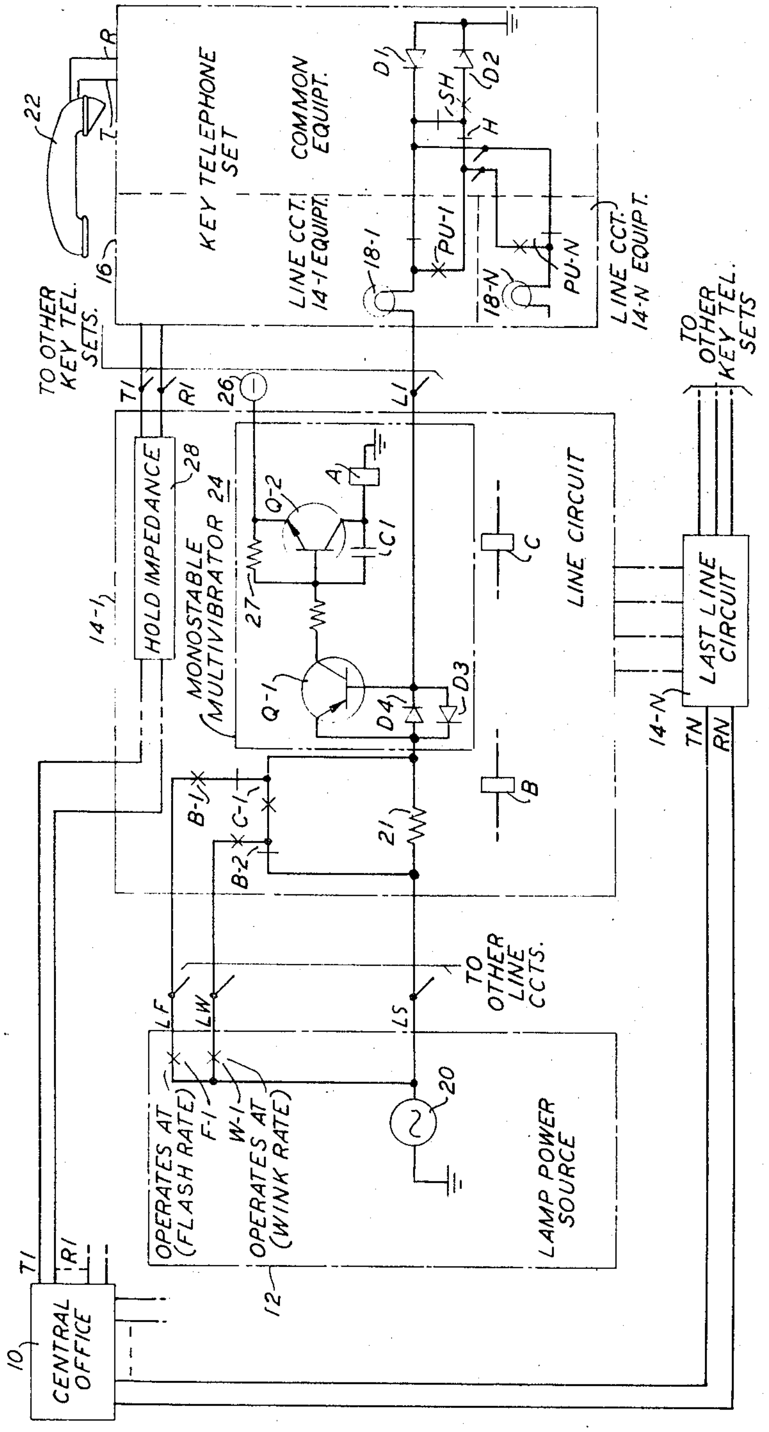
INVENTORS J. C. LACEY III
J. R. McEOWEN
BY Howard R. Popper
ATTORNEY United States Patent Office 3,453,396
Patented July 1, 1969

3,453,396
KEY TELEPHONE SYSTEM SIGNALING CIRCUIT

Joseph C. Lacey III, Davis, Calif., and James R. McEowen, Madison Township, Middlesex, N.J., assignors to Bell Telephone Laboratories, Incorporated, New York, N.Y., a corporation of New York Filed Jan. 20, 1966, Ser. No. 521,923
Int. Cl. H04m 1/21
U.S. Cl. 179—99 14 Claims

ABSTRACT OF THE DISCLOSURE

Line illumination for a key telephone set line lamp is provided in such a way that the bidirectional nature of the alternating current power on the lamp illumination lead enables that lead to be used to carry control information as well thereby eliminating the usual A lead of such key telephone sets. Pairs of oppositely poled diodes effectively provide two paths connected to the lamp illumination lead, and a transistor detector connected to the lamp illumination lead recognizes which of these paths is being utilized. The particular paths are themselves controlled by the keys at the key telephone set.

This invention relates to key telephone systems, and more particularly, to an arrangement for transmitting control signals between the key telephone set and its associated line circuit.

A key telephone system enables several key-equipped telephone sets to share access to two or more individual telephone lines by proper key manipulation. Each of the telephone lines from a central office or a private branch exchange usually is connected to a key telephone system through an individual line circuit. The line circuit is controlled by the central office to initiate a ringing signal at one or more of the sets connected to the key telephone system and to light the line lamp associated with the appropriate translucent line pick-up key at each of the sets. Keys at the sets may be selectively operated to cause one of the line circuits to cut through its associated line to the handset, or to establish a hold condition on the line and to appropriately illuminate the respective line lamps to indicate that a particular line is picked up, held or released.

In some systems, it is necessary to connect the key telephones to the line circuits through individual sets of tip, ring, lamp power and A leads for each line. As usual, the tip and ring leads provide the voice paths for a particular line. The lamps lead transmits various patterns of power pulses to the associated line lamps to produce distinct visual signals indicative of the ringing, answered or held status of the line. The A lead is connected to or disconnected from ground by manipulating the hold key at one of the sets to energize or release an A relay which, when taken with the condition of the tip and ring leads, enables the line circuit to detect the initiation of a "hold" request at one of the sets. The line circuit then responds to the A lead signal to provide lamp illumination appropriate to the new status of the line, and connects or disconnects a hold bridge to the tip and ring leads. A typical prior art key telephone system embodying these features is described in more detail in an article titled "The 1A1 Key Telephone System" by L. H. Allen in the Bell Laboratories Record, April 1956, vol. 34, No. 4, pages 140–142.

Thus, according to the prior art, four leads were required to connect a line circuit to each set. This situation is acceptable if only a few lines are required to be served by the key telephone system. In key telephone systems serving a large number of lines, such as airline terminals and some government offices, those four leads for each line become burdensome. For example, a prior art key telephone system with access to thirty lines requires one or more cumbersome and unsightly cables containing at least 120 leads.

In accordance with the principles of the present invention, the need for the A lead which has characterized prior art line circuitry may be eliminated, and a 25 percent reduction in leads and cable size may be achieved. Thus in the example cited, by eliminating the A lead, only 90 rather than 120 leads are needed to connect 30 lines to the key telephone sets.

Consequently, it is an object of the invention to eliminate one of the leads usually connected key telephone sets to a line circuit.

It is another object of the invention to eliminate the A lead which has characterized some line circuits in the prior art.

It is still another object of the invention to provide a reliable and economical means for transmitting control signals between the line circuit and the key telephone sets associated therewith.

In accordance with the present invention, the bidirectional nature of the alternating current power on the lamp illumination lead enables this lead to be used to carry control information as well as lamp illumination power between the key telephone set and the line circuit. More particularly, a pair of oppositely-poled diodes at the line circuit, and a corresponding pair at the key telephone set, are employed selectively to steer positive and negative pulses of the alternating current lamp illumination power to establish the required line conditions. The line pick-up and switchhook contacts are so connected with the diodes and lamp illumination lead, that when the line is being rung by the central office one set of these diodes permits negative half cycles of the lamp illumination power (supplied at the "flashing line" rate by the line circuit) to appropriately illuminate the line lamp. When the line pick-up key is thereafter operated to answer the call, the other set of diodes is switched in to permit only positive half cycles of lamp illumination power to illuminate the line lamp. A transistor circuit associated with the lamp illumination lead at the line circuit senses the passage of the positive half cycle power pulses on the line and operates the line circuit A relay which in turn executes its normal line circuit functions resulting, inter alia, in the line circuit now applying non-flashing (AC) power to illuminate the lamp. Should the hold key now be operated, the continuity of the lamp lead is caused to be interrupted by the hold key contact for more than a half cycle, thereby allowing the transistor circuit, which includes a timing arrangement, to release the A relay. This action thereupon causes insertion of the conventional holding bridge across the tip and ring conductors and further causes the line circuit to apply lamp power at the "wink" rate to the lamp lead. If the line is picked up again, the transistor circuit, which may be thought of as a timeout circuit, delay circuit, or a monostable multivibrator is reactivated to reoperate the A relay, remove the holding bridge and reapply non-flushing power to the lamp lead.

When a call is terminated, switchhook contacts at the set reconnect the negative-passing diode and disconnect the positive-passing diode, thereby deactivating the multivibrator and releasing the A relay. The line circuit then releases any other operated relays and connects a resistor to the lamp lead so that the power from the lamp power source, which advantageously may be left connected to the lamp lead, will be lower than the lamp illumination threshold. The line is restored to an idle status.

It is a feature of this invention to selectively steer negative and positive half-cycles of lamp power at the key telephone set to remotely control the operation of the line circuit.

It is a further feature of our invention that a single lead is utilized both for applying the various lamp power signals to the line lamp and for control purposes, the lamp power signals being sufficiently attenuated so as not to illuminate the lamp under certain conditions while still being available for control purposes. Thus, in accordance with this aspect of our invention, lamp power is continuously applied to a single lead for control purposes, the ability of this power to illuminate the lamp being determined by various operations of the circuit.

It is a still further feature of this invention that the line lamp is illuminated at various times during the circuit operation by different polarity half-cycles of the alternating current lamp power and control circuitry is responsive to the particular polarity of the lamp power to determine control operations of the line circuit.

Another feature of the invention is the use of a monostable multivibrator, or other similar means, in the line circuit to distinguish between the absence of lamp illumination current during negative half-cycles of the AC lamp power source and the interruption of lamp current occasioned by the operation of the hold key.

Still another feature of the invention is the control of pairs of oppositely-poled diodes at the key telephone set and at the line circuit to permit both the appropriate illumination of the line lamp as well as the sensing of the line circuit states desired to be effected by the key telephone set.

The foregoing and other objects and features may become more apparent by referring now to the following detailed description together with the drawing, the single figure of which is a schematic diagram of a key telephone system exemplifying the present invention.

Considering the drawing, a plurality of lines T1R1 to **T*n*R*n* extend from a central office 10 to the corresponding line circuits 14–1 to 14–*n*** of the key telephone system. These line circuits are described in more detail in C. E. Morse and J. P. Smith United States patent application Ser. No. 246,905, filed Dec. 26, 1962, now Patent No. 3,239,610, issued Mar. 8, 1966, and only so much of the line circuit operation will be described as is necessary to completely understand the circuit which comprises the subject matter of this invention. Each line circuit includes control relays A, B and C whose operations and functions are fully described in the Morse et al. application.

As is well known, the key telephone system will typically include a plurality of key telephone sets such as the trademarked CALL DIRECTOR set manufactured by the Western Electric Co. For the sake of simplicity only one such set 16 is shown in the drawing. Set 16 includes the usual handset 22, switchhook SH, hold key H, and a plurality of individual line pick-up keys PU–1, et cetera, and line lamps 18–1, et cetera, corresponding to the line circuits 14–1, et cetera, to which the set 16 is desired to have access.

The key telephone system has an interrupter or lamp power source 12, common to line circuits 14–1 to **14–*n***, that provides the flashing, steady and winking lamp power pulses characterizing the ringing, off-hook and holding line conditions, respectively.

When line T1R1 is idle, the line circuit relays A, B and C of line circuit 14–1 are inactive and line lamp 18–1 of key telephone set 16 should be dark. In accordance with one aspect of this invention, a power supply 20, which may advantageously be 25 volts AC, is connected to line circuit 14–1 through lead LS. Within line circuit 14–1, a voltage dropping resistor 21 reduces the effective potential of the alternating current signal to a value below the illumination threshold of line lamp 18–1, as for example to 3 volts or less. Line lamp 18–1, moreover, is connected selectively to ground on one side through a pair of parallel connected and oppositely-poled diodes D1 and D2. The other side of line lamp 18–1 is connected to lamp lead L1 and through another pair of oppositely-poled and parallel connected diodes D3 and D4 to lead LS.

Thus in the idle condition, a circuit is established from power supply 20 to ground at key telephone 16 for the negative half-cycles of the AC signal through lead LS, resistor 21, negative-passing diode D3, lamp lead L1, line lamp 18–1, line pick-up transfer break contacts PU–1, and negative-passing diode D1. Because resistor 21 drops the effective voltage of the negative half-cycles below the illumination threshold of line lamp 18–1, the lamp is not lit, thereby indicating that the line is idle.

As more fully described in the aforementioned C. E. Morse et al. patent application, a ringing signal transmitted from central office 10 on line T1R1 energizes relay B. In accordance with the invention, however, operated relay B connects negative pulses of ½-second ON-OFF lamp flashing power to line lamp 18–1 through a circuit that bypasses voltage dropping resistor 21. Consequently, the unattenuated flashing pulses illuminate lamp 18–1 at a distinctive rate that visually characterizes the ringing signal. This flashing power circuit is completed from power source 20, through contacts F–1 in interrupter 12, through lead LF and operated make contact B–1, transfer break contacts C–1, negative passing diode D3, lamp lead L1, line lamp 18–1, transfer break contacts PU–1, and negative-passing diode D1 to ground. Interrupter 12 causes contacts F–1 to operate at the desired flashing rate, as is known in the art.

It may be noted at this point that while the flashing power to illuminate lamp 18–1 is applied through diode D3 to lead L1 and bypasses resistor 21, the above described negative half-cycles from source 20 are still being transmitted through the resistor 21 to the lamp 18–1.

An incoming call is answered by manipulating line pick-up key PU–1 for line T1R1 and taking handset 22 off-hook. These actions operate transfer make contacts PU–1 associated with the line pick-up key and switchhook transfer contacts SH associated with the switchhook. Thus, in accordance with our invention, negative-passing diode D1 is disconnected from lamp lead L1 and positive-passing diode D2 is connected in series with lamp lead L1 and line lamp 18–1. This establishes a circuit for positive half-cycle pulses from power supply 20 through lead LS, voltage dropping resistor 21, positive-passing diode D4, lamp lead L1, line lamp 18–1, operated transfer make contacts PU–1, hold key break contacts H, operated switchhook transfer make contacts SH and positive-passing diode D2 to ground.

In this circumstance the signal on lead L1, having passed through resistor 21, is, however, now comprised of low voltage positive half-cycle pulses, which again fail to illuminate lamp 18–1.

The positive voltage pulses applied through the resistor 21 and on lead L1 cause the transistor $Q_1$ in the monostable multivibrator 24 to turn on. Diode D4 may advantageously be a silicon junction device and transistor $Q_1$ a germanium junction device. The diode D4 allows the required current to be applied to light line lamp 18–1 when resistor 21 is shorted out as discussed just below.

Activated transistor $Q_1$ biases transistor $Q_2$ into a conducting state. When transistor $Q_2$ conducts, it energizes relay A by completing a circuit from battery 26, through the emitter and collector of transistor $Q_2$, and the winding of relay A to ground. Thus the line circuit A relay is energized in an entirely novel manner.

As described in the aforementioned C. E. Morse et al. patent application, relay A, when operated, causes relay B to release. Relay A, moreover, causes relay C to operate and complete the connection between line T1R1 and leads T and R in handset 22.

In accordance with the invention, line lamp 18–1 is now steadily illuminated because energized relay C at its transfer make contacts C–1 shunts voltage dropping resistor 21, and at its transfer break contacts C–1 disconnects the lamp flashing signal on lead LF from lamp 18–1. Thus relays A and C establish a path for the full positive half-cycle signal from power supply 20, through lead LS, transfer break contacts B–2, operated transfer make contacts C–1, positive-passing diode D4, lamp lead L1, line lamp 18–1, operated transfer make contacts PU–1, break contacts H and operated transfer make contacts SH through positive-passing diode D2 to ground. Line lamp 18–1, which is lit steadily in the foregoing manner, provides a visual indication that handset 22 is off-hook and connected to line T1R1.

In accordance with an aspect of our invention, lead L1 provides both the control signals and the lamp illumination power, which priorly required separate leads. At this point this double function can be noted. As mentioned above, signals of low voltage continuously are applied from source 20 through the resistor 21 to lead L1. During the application of flash power from lead LF these low power negative half-cycles were not of significance. However, as soon as the call is answered, these low power signals are positive half-cycles; this control signal is immediately detected by detector 24 regardless of the presence of any power on the power lead LF, which is energized now by positive half cycles at the flashing rate.

It will be recalled that relay A was operated by transistor $Q_1$ sensing the positive half-cycle voltage drop across diode D4. In order to prevent the release of relay A during the intervals between the positive half-cycles on lead L1, transistor $Q_2$ is kept conducting by a charging circuit comprising resistor 27, capacitor $C_1$, and the DC resistance of relay A. When transistor $Q_1$ is conducting, capacitor $C_1$ discharges through conducting transistor $Q_2$. During the half-cycle intervals between positive pulses, $Q_1$ is nonconducting and the capacitor charges through resistor 27 and the DC resistance of relay A. The charge stored in the capacitor during charging keeps $Q_2$ turned on for a time that is slightly longer than one negative half-cycle interval. Because this multivibrator relaxation time is greater than the half-cycle interval, monostable 24 maintains relay A energized as long as the continunity of lead L1 is uninterrupted.

To establish a hold condition the line circuit relay A is released. As described more completely in the C. E. Morse et al. patent application, hereinbefore mentioned, the deenergization of relay A first connects hold impedance 28 across leads T1 and R1 and then disconnects handset 22 from these leads. To release the A relay in the illustrative embodiment, nonlocking hold key H at key set 16, is momentarily depressed to operate break contacts H and disconnect positive-passing diode D2 from lamp lead L1. This circuit interruption, in which no current is flowing through lead L1, must be greater than the interval between positive half-cycles in order to release multivibrator 24. In this circumstance transistor $Q_2$ is turned off and deenergizes the winding of relay A. Line circuit 14–1 responds to the circuit continuity through the tip and ring leads and the restored A relay by connecting the hold impedance 28 across leads T1 and R1 in the manner more fully described in the priorly mentioned C. E. Morse et al. patent application.

Releasing the momentarily-depressed nonlocking hold key at set 16 releases the line pick-up key, the released transfer contacts PU–1 of which disconnect positive-passing diode D2 from line lamp 18–1 and connect negative-passing diode D1 in series therewith.

With relay A released in the foregoing manner, relay C remains energized and relay B is operated as disclosed in the above-mentioned application of C. E. Morse et al. Lamp wink rate pulses that identify the hold condition are transmitted from power supply 20 in interrupter 12, through contacts W–1 in lead LW and operated transfer make contacts B–2, operated transfer make contacts C–1, negative-passing diode D3, lead L1, line lamp 18–1, transfer break contacts PU–1, and negative-passing diode D1 to ground. The lamp wink pulses thus bypass voltage dropping resistor 21 and have sufficient potential to illuminate lamp 18–1. With relay B operated, transfer break contacts B–2 disconnect the shunt for lead LS around resistor 21. During the hold condition, therefore, the circuit from power supply 20 to lamp 18–1 includes resistor 21, and, consequently, only the negative half-cycles of low voltage are transmitted over lead L1 when the wink interrupter circuit is in its interrupted state.

The hold condition is released and handset 22 is once more connected to line T1R1 by manipulating the line pick-up key to operate transfer contacts PU–1. This action connects positive-passing diode D2 in series with lamp 18–1 and disconnects negative-passing diode D1. Multivibrator 24 responds to the positive pulses being steered through diode D4 by turning on and energizing relay A. Line circuit 14–1 then reacts in the manner described in connection with the off-hook condition to reconnect handset 22 to line T1R1. Energized relay A operates relay C to shunt down resistor 21 and apply lamp steady power to lamp 18–1 through the path previously described. Relay C also operates transfer break contacts C–1 to disconnect the lamp wink signal from lamp 18–1.

At this point the dual use of lead L1, in accordance with our invention, should again be noted. As discussed above while the circuit is operating in the hold condition, two different signals are applied to lead L1. The first of these signals is the wink power signal applied by operation of contacts W–1 at the wink rate in bypass of resistor R1; this signal illuminates the lamp 18–1 at the desired rate. The second of these signals is the control signals applied directly from source 20 through resistor 21; this signal is of low voltage and cannot illuminate the lamp. When the line pick-up key is depressed and transfer contacts PU–1 operated, the immediate effect is to change the polarity of the applied signals. The wink power signal applied to the lamp is now the positive half cycle. Similarly, the positive half-cycle of the control signal is applied from source 20 directly through resistor 21.

The detection circuit recognizes this change in polarity in both signals at the diode D4 and the circuitry operates as described above to remove the wink power signals. The detector 24 then remains enabled by the signals applied directly from source 20 through diode D4, with resistor 21 shunted.

Line T1R1 is released by replacing handset 22 in the cradle to restore switchhook transfer contacts SH. Other switchhook make contacts (not shown) at the same time disconnect leads T and R from leads T1R1. This connects negative-passing diode D1 to the lamp through a path from lamp 18–1, operated transfer make contacts PU–1, break contacts H, and negative-passing diode D1 to ground. In these circumstances, the signal on lead L1 comprises low-voltage negative half-cycles. These negative pulses deactivate multivibrator 24, thereby causing relay A to release. Simultaneously disconnecting handset 22 and restoring the A relay is interpreted by line circuit 14–1 as a signal to release line T1R1. This is accomplished by releasing relay C, in the manner more fully described in the priorly mentioned C. E. Morse et al. patent application.

As an alternative, line T1R1 can be released by operating the pick-up key for some other line available at set 16. This releases the locking pick-up key associated with line T1R1 and restores transfer contacts PU–1 and disconnects handset 22 from line T1R1. Restored contacts PU–1 disconnect positive-passing diode D2 and release relay A to return line T1R1 to an idle status in the manner described.

Thus the features of this invention provide a novel modification to existing line circuitry that eliminates the conventional A lead by utilizing the bidirectional nature of the alternating current loop source to code the A lead information onto the lamp lead.

It should be noted that the circuit is arranged in such a manner that when several key telephone sets are connected in multiple across T1R1 and L1, any set in the off-hook state on this line produces signals which override any hold or idle indication from other sets connected to this line.

It should be additionally noted that a diode, poled in the same direction as diode D1 and placed in shunt around time pick-up back contacts PU–1 would cause both half-cycles of AC to go through lamp 18–1 when set 16 is picked up on line T1R1. This would cause lamp 18–1 to be brighter than any other lamp at the set.

It is to be understood that the above-described arrangement are merely illustrative of the principles of this invention and various other arrangements may be devised by those skilled in the art without departing from the spirit and scope of the invention.

What is claimed is:

1. A key telephone set circuit comprising
a line pick-up key,
a line lamp,
a hold key,
a line lamp illumination lead,
a first path normally connected to said line lamp for permitting said lamp to be illuminated in accordance with the power appearing on said lamp illumination lead,
a second path connectable to said line lamp by operation of said line pick-up key for also permitting said lamp to be illuminated in accordance with the power appearing on said lamp illumination lead,
said pick-up key when operated disconnecting said first path from said lamp,
and detector means coupled to said line lamp illumination lead at a point remote from said line pick-up key for determining which of said first and said second paths is connected to said line lamp.

2. A key telephone set circuit according to claim 1, wherein said detector means comprises a multivibrator.

3. A key telephone set circuit according to claim 1, wherein said first and second paths comprise oppositely-poled diodes.

4. A key telephone circuit comprising
a line circuit,
a key telephone set including a line lamp,
a lamp illumination lead for supplying lamp illumination power from said line circuit to said key telephone set line lamp,
a key telephone set line pick-up key connected to said lead and operable to transfer said lamp illumination power from a first to a second path at said telephone set,
a hold key for interrupting said lamp illumination power in said second path and releasing said pick-up key to restore said lamp illumination power to said first path,
and means at said line circuit for detecting the path to which said lamp illumination power is transferred at said key telephone set.

5. A key telephone circuit according to claim 4, wherein said hold key comprises contacts inserted in said second path by operation of said pick-up key.

6. A key telephone circuit according to claim 5, wherein said hold key and said hold key contacts comprise means operable to break continuity of said second path and release said pick-up key to restore said first path.

7. A key telephone circuit according to claim 6, wherein said detector means is normally in an unoperated state when said first path is connected and operates only when said second path is connected.

8. A key telephone circuit according to claim 7, wherein said first and second paths comprise oppositely-poled, unidirectional conducting devices.

9. A key telephone circuit according to claim 8, wherein said lamp illumination power supplied to said lamp illumination lead comprises AC power and wherein said first and second unidirectional current devices are connected to apply opposite-polarity half-cycles of said AC power to said line lamp.

10. A key telephone circuit according to claim 9, wherein said detector means comprises further unidirectional circuit means connected to said lamp lead for activating and deactivating said detector means according to the polarity of said illumination power permitted to be conducted by said lamp lead.

11. In a key telephone system including a telephone line,
a key telephone set having a line lamp,
a line circuit,
a lamp illumination lead connecting the line circuit with said lamp to transmit alternating current lamp power therebetween,
a circuit comprising a pair of oppositely-poled diodes at said key telephone set,
a locking pick-up key having back contacts thereon for connecting one diode of said pair of diodes to said line lamp and said lamp illumination lead to steer said lamp power pulses of one polarity therethrough when said key is released and front contacts for connecting the other diode of said pair to said line lamp and said lamp lead to steer said lamp power pulses of another polarity therethrough when said key is operated,
a pair of oppositely-poled line circuit diodes in said line circuit and connected to said lamp illumination lead for selectively steering said one polarity lamp power pulses through said line circuit when said pick-up key is released and steering said other polarity lamp power pulses through said line circuit when said pick-up key is operated,
a multivibrator in said line circuit responsive to said other polarity lamp power pulses steered therethrough for connecting said telephone line to said key telephone set,
a nonlocking hold key operable to disconnect said other polarity pulse steering diode at said key telephone set from said lamp lead,
and a hold impedance controlled by said multivibrator for bridging said telephone line to hold said line when said hold key is operated.

12. In a key telephone system having a telephone line,
a key telephone set having a lamp,
a line circuit,
a lamp illumination lead connecting the line circuit of said lamp to transmit alternating current lamp power therebetween,
a positive pulse-steering diode,
a negative pulse-steering diode,
a locking line pick-up key at said key telephone set having transfer contacts thereon for connecting said negative steering diode to said lamp lead to steer said alternating current negative lamp power pulses therethrough when said key is released and for connecting said positive steering diode to said lamp lead to steer said alternating current positive lamp power pulses therethrough when said key is operated,
a monostable multivibrator in said line circuit connected to said lamp lead and responsive to said positive pulses in said alternating current lamp power steered through said lamp lead when said pick-up key is operated to connect said telephone line to said key telephone set,
a nonlocking hold key at said key telephone set having contacts for temporarily disconnecting said positive pulse-steering diode from said lamp lead,
and a hold impedance controlled by said monostable multivibrator to bridge said telephone line.

13. A circuit according to claim 12, wherein said monostable multivibrator comprises timing means for keeping said multivibrator active between said positive pulses, and charging means for charging said multivibrator timing means during said positive pulses to keep said hold bridge disconnected from said telephone line.

14. A circuit according to claim 13, wherein said lamp illumination lead comprises a resistor for attenuating said alternating current lamp power to prevent said pick-up key from being illuminated, and a shunt responsive to said multivibrator for bypassing said resistor.

References Cited

UNITED STATES PATENTS

| | | | |
|---|---|---|---|
| 2,862,062 | 11/1958 | Carter | 179—99 |
| 3,239,610 | 3/1966 | Morse et al. | 179—99 |

KATHLEEN H. CLAFFY, *Primary Examiner.*

W. A. HELVESTINE, *Assistant Examiner.*

U.S. Cl. X.R.

179—81